United States Patent [19]

Fombarlet et al.

[11] Patent Number: 4,722,787
[45] Date of Patent: Feb. 2, 1988

[54] APPARATUS FOR CONTACTING TWO IMMISCIBLE LIQUIDS WITH THE APPLICATION OF AN ELECTRIC FIELD

[75] Inventors: Christine Fombarlet, Saint Etienne; Michel Guenehec, Saint-Paul-Troi; Francis Lancelot, Saint Etienne; Laurent Martin, Lagarde; Paul Vignet, Orange, all of France

[73] Assignees: Commissariat a l'Energie Atomique; Association pour la Recherche et le Developpement des Met Hodes et Processus Industriels (A.R.M.I.N.E.S.)

[21] Appl. No.: 761,358

[22] Filed: Aug. 1, 1985

[30] Foreign Application Priority Data

Aug. 2, 1984 [FR] France .................... 84 12243

[51] Int. Cl.⁴ .................... B01D 17/06
[52] U.S. Cl. .................... 210/209; 210/748; 210/243; 204/302
[58] Field of Search ............ 210/243, 748, DIG. 5, 210/209; 204/302

[56] References Cited

U.S. PATENT DOCUMENTS

| | | | |
|---|---|---|---|
| 1,559,035 | 10/1925 | Egloff et al. | 210/243 |
| 1,838,376 | 12/1931 | Eddy | 204/302 |
| 1,838,924 | 12/1931 | Fisher | 204/302 |
| 1,887,010 | 11/1932 | Cage | 204/302 |
| 4,182,672 | 1/1980 | Martin | 204/302 |
| 4,238,304 | 9/1980 | Zucker | 204/131 |
| 4,308,127 | 12/1981 | Prestridge et al. | 204/302 |
| 4,409,078 | 11/1983 | Wagner et al. | 204/188 |
| 4,415,426 | 11/1983 | Hsu et al. | 204/302 |
| 4,636,290 | 1/1987 | Bethuel et al. | 204/186 |

FOREIGN PATENT DOCUMENTS 0072628 2/1983 European Pat. Off.
2021060 10/1969 France
2496081 6/1982 France .................... 210/748
50-82599 7/1975 Japan
156309 9/1983 Japan .................... 210/748
995848 2/1983 U.S.S.R. .................... 210/243

OTHER PUBLICATIONS

Davies and Jeffreys, "Separation of Droplet Dispersions—Part 1, Coalescence of Liquid Droplets", *Filtration & Separation*, Sep./Oct. 1970, pp. 546-550.

Kowalski and Ziolkowski, "Increase in Rate of Mass Transfer in Extraction Columns by Means of an Electric Field", pp. 323-327, *International Chemical Engineering*, (vol. 21, No. 2), Apr. 1981.

*The Merck Index*, 10th ed., Merck & Co., Inc., 1983, p. 1091.

*University Physics*, 5th ed., Sears et al., Addison-Wesley Publishing Co., 1979, 464-468.

*Primary Examiner*—Richard V. Fisher
*Assistant Examiner*—Linda S. Evans
*Attorney, Agent, or Firm*—Pearne, Gordon, McCoy & Granger

[57] ABSTRACT

The invention relates to an apparatus for contacting two immiscible liquids having at least one electrode for the application of an electric field.

The electrode is coated with at least two layers of different insulating materials, the first layer which is in contact with the electrode being formed from a liquid insulating material, e.g. benzylneocaprate or transformer oil, while the outer layer is formed from a solid insulating material, e.g. polytetrafluoroethylene.

These electrodes are preferably in the form of bars arranged parallel to the fluid flow direction and they are provided with deflectors to ensure that no dispersed phase flow in the form of a film takes place along the bars.

11 Claims, 9 Drawing Figures

APPARATUS FOR CONTACTING TWO IMMISCIBLE LIQUIDS WITH THE APPLICATION OF AN ELECTRIC FIELD

BACKGROUND OF THE INVENTION

The present invention relates to an apparatus for contacting two immiscible liquids (hereafter also referred to as fluids), more particularly usable in liquid-liquid extraction installations or to installations for the transfer of heat by direct contact. More specifically, it relates to apparatuses of this type in which the mixing and/or separation of the phases takes place by applying an electric field, the continuous field weakly conducting electricity.

In such apparatuses, the two immiscible phases are brought into cocurrent or countercurrent circulation and one of the phases is dispersed in the form of droplets or bubbles in the other phase, which constitutes the continuous phase. Electrodes arranged in an appropriate manner in the apparatus make it possible to apply an electric field to the fluid circulating there and to bring about, according to the field value applied, a coalescence of the droplets or bubbles of the dispersed phase or a mixture of the circulating fluids. Thus, when the electric field applied to the continuous phase is sufficiently intense, the electrostatic pressure which it exerts on the surface of the droplets exceeds the interfacial cohesion forces. The droplets explode, so that electrostatic sputtering or atomization is obtained. In this case, the field also makes it possible to increase the transfer coefficients.

However, when the electric field is weaker, it produces attraction forces between the droplets or modifies the movement thereof, thus increasing the probability of meeting, said different mechanisms accelerating the coalescence of the dispersed phase.

U.S. Pat. No. 4,161,439 illustrates an apparatus of this type in which a set of two electrodes is positioned with a variable spacing of the electrodes as a function of their height, so as to alternately produce in the column dispersion zones and coalescence zones of the droplets of the dispersed phase.

However, this apparatus suffers from the disadvantage of having a large cross-section compared with the useful passage cross-section of the phases. The circulation time and the residence time of the phases also differ in the dispersion and coalescence zones. Moreover, the electric supply system only makes it possible to vary the value of the field along the axis of the column and not its other characteristics. In the same way, the ratio between the fields of one stage and the other is fixed by the geometry of the electrodes and cannot vary.

British Pat. No. 1 205 562 illustrates an apparatus of the same type, in which use is also made of an electrostatic field for ensuring the dispersion and separation of the phases present.

When the dispersed phase is an aqueous phase having relatively high electrical conductivity, the electrodes can be covered with a layer of insulating material, e.g. polyethylene, to prevent any short-circuit between the electrodes to which high voltages are applied, cf the article of W. Kowalski and Z. Ziolkowski (International Chemical Engineering, vol. 21, no. 2, pp. 323-327).

However, the use of electrodes of this type does not make it possible to completely prevent in the long term the risks of short-circuits due to the breakdown of the insulant when using a highly electricity conducting dispersed phase with a high retention coefficient.

SUMMARY OF THE INVENTION

The present invention relates to an apparatus for contacting two immiscible liquids making it possible to obviate the aforementioned disadvantages of the Prior Art apparatuses.

The present invention therefore specifically relates to an apparatus for the cocurrent or countercurrent contacting of two immiscible fluids, whereof one constitutes a continuous phase and the other constitutes a phase dispersed in the form of droplets or bubbles in the continuous phase, comprises at least one insulant-coated electrode for bringing about the mixing and/or the separation of the two phases by the application of an electric field, wherein the insulating coating of said electrode is constituted by at least two layers of different materials, the first layer in contact with the electrode being formed from a liquid insulating material and the outer layer being formed by a solid insulating material.

This special structure of the insulant coating of the electrodes makes it possible to obtain a good dielectric breakdown resistance. Thus, when the phases circulate in the apparatus, dispersed phase bridges, which are generally very conductive are formed between the electrodes. This phenomenon increases in frequency as the retention coefficient of the dispersed phase increases. All the potential differences at the terminals of the electrodes are then applied to the insulating coating, whereof the dielectric strength must be sufficiently high and must also be maintained over a period of time.

According to the invention, the formation of a first liquid insulating layer is advantageous, because it obviates the presence of an air film at the interface between the conducting part of the electrode and the insulant. Thus, there is a significant increase in the resistance to dielectric breakdown of the electrode and consequently it is possible to operate with high retention coefficience of the dispersed phase .

For example, the liquid insulating material can be constituted by phenylxylylethane, a polychlorodiphenyl compound, benzylneocaprate, also known by the designation benzylneodecanoate or transformer oil.

The solid insulating material is advantageously an organic polymer, e.g. a polyolefin, such as polyethylene and polypropylene, or preferably a fluorine-containing polymer such as polytetrafluoroethylene or vinylidene polyfluoride. This solid material must be inert with respect to the phases circulated in the apparatus.

The total thickness of the insulating coating is determined as a function of the two following criteria.

1. The dielectric strength of the insulating layers, which must be higher than the maximum field liable to be applied to the coating in the case of conductive bridging of two electrodes. This field is equal to $\Delta V/e$ if a single electrode is coated ($\Delta V$ representing the maximum potential difference between the electrodes), or $\Delta V/2e$ if both electrodes are coated.

2. The fraction of the voltage drop in the coating, which must be low compared with that occuring in the continuous phase, so that the electric field in this phase is not reduced. For this purpose, the impedance of the coating must be weak compared with that of the continuous phase and this condition can be represented in the following form: $RC + \phi > 1/\omega$ with R representing the resistance of the continuous phase in one stage, C the equivalent capacitance of the coating of the electrodes, φ the relaxation time of the continuous phase and ω the ripple of the potential difference between the electrodes.

In general, the total thickness of the insulating coating is 0.1 to 5 mm and the thickness of the solid insulating material layer generally exceeds the thickness of the layer of liquid insulating material. For example, the thickness of the solid insulating material layer can be 0.5 to 1 mm, whilst the thickness of the liquid insulating material layer is 0.2 to 0.5 mm.

The electrodes can be made for any electricity-conducting material, e.g. metal or alloy, graphite, electricity-conducting polymer or an organic conductor.

The following procedure is adopted for producing the insulating material-coated electrode. In a tube which has previously been sealed at one end and which constitutes the outer layer of the solid insulating material is engaged a conductor wire, e.g. made from metal or graphite and which will form the actual electrode, its diameter being slightly smaller than the internal diameter of the tube. A liquid insulating material, e.g. transformer oil or benzylneocaprate is then instroduced into the space between the tube and the wire. Preferably, said operation is carried out in a vacuum enclosure to ensure that the liquid does not trap air bubbles liable to aid a subsequent perforation of the insulant. It is also useful to de-gas and dehydrate the liquid beforehand and also carry out a polishing of the conductor wire.

The electrodes used in the apparatus according to the invention can have numerous different forms and can e.g. be produced in the form of grids, patterns arranged transversely to the flow of fluids, e.g. in the form of rings, spirals, sinusoids, etc.

According to a preferred embodiment of the invention, the electrodes are in the form of bars arranged parallel to the fluid flow direction and said bars are provided with deflectors to ensure that there is no dispersed phase flow in the form of a film along said bars. These deflectors can be constituted by rings arranged on the bars and they are preferably made from a material which is only slightly wettable by the dispersed phase.

The presence of these deflectors makes it possible to stop and redistribute towards the center of the interelectrode space the dispersed phase, which can flow in the form of a film along the bars. Without these deflectors this flow or trickling phenomenon, which increases as the flow rate of the dispersed phase increases, would decrease the efficiency of the contactor, because the transfer of the material between the continuous phase and the dispersed phase flowing along the bars is slight. The deflectors can be made from a random insulating or non-insulating material, but it is preferably only slightly wettable by the dispersed phase and e.g. polytetrafluoroethylene can be used.

These deflectors can also have different shapes, so that they simultaneously serve as a lining aiding contact between the two phases. Thus, they can be constituted by planar or non-planar, perforated rings. Preferably, these deflectors are in contact with the wall of the apparatus, so as to ensure that there is no trickling of the dispersed phase of the apparatus walls.

In addition, the deflectors are generally staggered relative to one another on two electrodes which face one another, so as to prevent the dispersed phase jets redistributed towards the center of the interelectrode space from being able to meet and thereby having the possibility of coalescing.

According to a preferred embodiment of the apparatus according to the invention, the latter comprises a plurality of electrodes arranged parallel to the flow direction of the fluids, said electrodes determining in the column a plurality of stages and being raisable to different potentials, in such a way that the electric field can vary in the different stages of the column. Thus, it is possible to succesively form in the column stages functioning as a disperser and stages functioning as a coalescer. In the coalescer stages, the voltage applied to the electrodes is below the critical value, so as to bring about the coalescence of the drops introduced into the column.

However, in the disperser stages, the voltage applied to the electrodes exceeds the critical value, so that the field is large enough to bring about the breaking of the droplets and consequently a dispersed phase bed is formed, whose retention coefficient increases and whereby the droplet diameter decreases as the potential difference increases.

According to an advantageous embodiment of the invention, when the apparatus is designed for countercurrent contacting of two fluids, said apparatus also comprises an electrocoalescer placed in that part of the apparatus between the inlet of the dispersed phase and the outlet of the continuous phase.

This electrocoalescer can have at least two electrodes, whereof one is positioned in the vicinity of the dispersed phase inlet and is connected to earth, whilst the other is live. The presence of an electrocoalescer of this type, having a simple design and high efficiency makes it possible to stop the entrainment of fine droplets of the dispersed phase and thus ensure the recycling thereof in the apparatus. The electric field produced by the electrocoalescer makes it possible to stop all the fine droplets as a result of the countercurrent of the phases and their circulation with respect to the electrodes. Thus, in the vicinity of an electrocoalescer electrode there is a high retention zone (e.g. 80%), which behaves in the same way as a porous medium. The droplets of the dispersed phase which have undergone a size increase under the action of the electric field trap the fine droplets which could be entrained by the continuous phase. Thus, the size of the droplets continues to rise within the heart of said zone until their size makes them move again in countercurrent manner with respect to the continuous phase and consequently reach the active part of the apparatus.

Thus, the apparatus can be operated very close to choking up without any significant entrainment of the dispersed phase. This makes it possible to increase the mean retention coefficient, as well as the flowrate of the two phases.

According to a preferred embodiment of the electrocoalescer, the latter has two electrodes connected to earth surrounding a live electrode.

According to another advantageous embodiment of the invention, when the apparatus is designed for the countercurrent contacting of two immiscible fluids, it comprises means for producing an electric field in the decanter or settler of the dispersed phase, in order to speed up the coalescence of the drops at the interface between the two phases in said decanter or settler.

The apparatus according to the invention can also have a lining in order to aid the mixing of the phases and which can e.g. be constituted by Raschig rings or balls. It is also possible to use perforated plates or baffles.

The apparatus according to the invention is more particularly applicable to the treatment of phases, whose continuous phase is slightly electricity-conducting. It can be used for extraction operations in nuclear, hydrometallurgical, petroleum, petrochemical, food and pharmaceutical industries.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
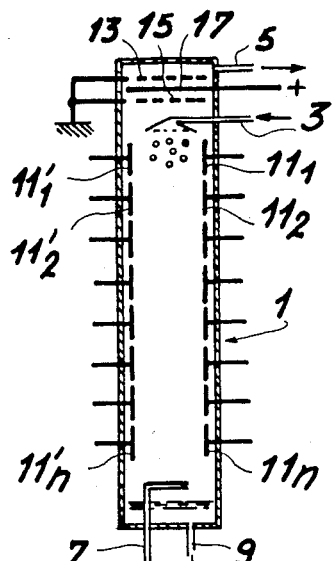
FIG. 1—Diagrammatically and in vertical section an apparatus according to the invention.

FIG. 1 shows that the apparatus comprises a cylindrical column 1 provided in its upper part with an inlet 3 for the heavy phase and an outlet 5 for the light phase and in its lower part with an inlet 7 for the light phase and an outlet 9 for the heavy phase. The upper and lower parts of the column consequently form the top and bottom decanters or settlers and can have a section above that of the central active zone of column 1. The column can be made from a random material, e.g. an electricity-conducting material, an electricity-conducting material coated with an insulant, or an insulating material such as glass. Preferably, the column is made from a material which is slightly wetted by the dispersed phase.

In the central part of the column constituting the active zone are provided groups of electrodes $11_1$–$11_1'$, $11_2$–$11_2'$, ..., $11_n$–$11_n'$, which thus define stages in the column. Electrodes $11_1$ and $11_1'$ are respectively connected to the poles of a voltage generator and are maintained in the column by strands, which permit their connection to said voltage generator.

Thus, it is possible to connect certain electrodes, e.g. $11_1'$, $11_2'$, ..., $11_n'$ to earth, whilst the other electrodes are connected to an electric generator. In this case, there is no need to coat with an insulant the electrodes which are connected to earth.

The column can also have a supplementary lining or packing other than the electrodes, e.g. Raschig rings or balls.

When the dispersed phase is constituted by the heavy phase, the upper part of the column forms a settled 14 and the settled dispersed phase is connected to earth. The decanter is the portion of the column where the decanted phase collects. Thus, the level of the interface or the voltage level of the lower stage is regulated in such a way that the field produced between the settled phase and said stage accelerates the coalescence of the drops at the interface and prevents the development of a dispersed phase bed. These arrangements make it possible to reduce the size of the bottom settler and consequently to reduce the volume of the immobilized phase.

Figure 2:
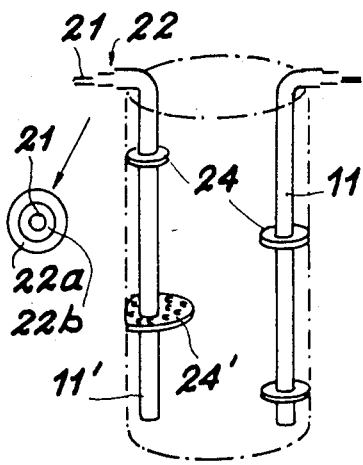
FIG. 2—A larger-scale view of one of the stages of the apparatus of FIG. 1.

FIG. 2 shows in greater detail the pair of electrodes $11_1$–$11_1'$ constituting the first stage of the apparatus. It can be seen that electrodes 11 and 11' are in the form of cylindrical bars and they have a conductive core 21, e.g. constituted by a metal wire, coated with an insulant 22. The latter has an outer layer 22a of a solid insulating material and an intermediate layer 22b of a liquid insulating material. To prevent the flow of a dispersed phase film on the cylindrical bars forming the electrodes, the latter are provided with deflectors 24 in the form of rings mounted on electrodes 11 and 11'. As can be seen in the drawing, deflectors 24 of electrode 11' are displaced in the heightwise direction with respect to the deflectors 24 of electrode 11. These deflectors are made from a material which is only slightly wetted by the dispersed phase, e.g. polytetrafluoroethylene and are in contact with the walls of the column. These deflectors are maintained on electrodes 11 and 11' by any appropriate means. For example, they can be engaged by force on the electrodes.

FIG. 2 shows at 24' another embodiment of the deflectors 24, in which the latter have a larger external radius on their portion located within the column, so as to also fulfill the function of a lining. In this case, the deflectors can be provided with perforations.

Although in FIG. 2 the electrodes of one stage are constituted by a pair of bars arranged parallel to the flow direction of the fluids in the column, it is also possible to use other electrode arrangements, e.g. to associate in each stage a plurality of bars between which a potential difference is maintained.

Figure 3A:
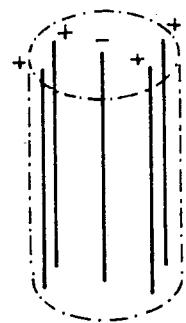
FIGS. 3i a–3d—Other arrangement modes for the electrodes of the apparatus according to the invention.
Figure 3B:
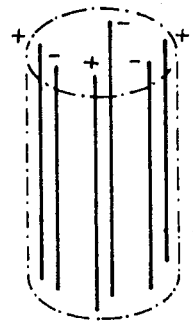
Figure 3C:
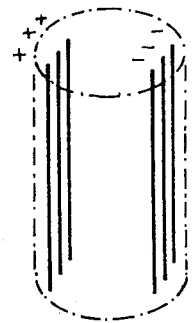

For example, FIGS. 3a, 3b and 3c show different arrangement modes of the electrodes in one stage.

Figure 3D:
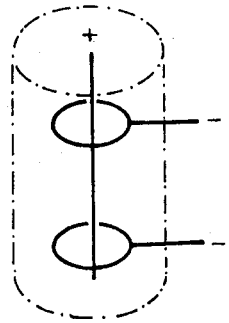
Figure 1A:
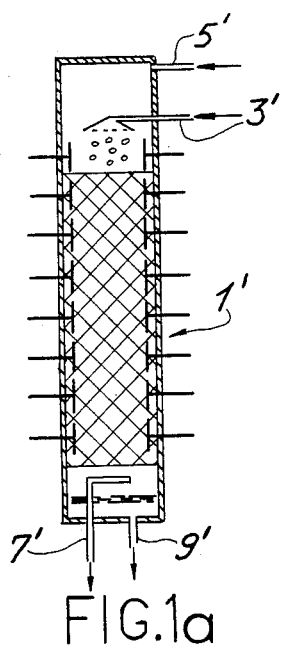
FIG. 1A—Cocurrent contacting apparatus.

In one stage, it is possible to associate an electrode arranged parallel to the fluid flow direction with electrodes arranged perpendicular to the fluid flow direction, like that indicated in FIG. 3d where a central electrode is connected to a pole of the voltage generator and associated with two transverse electrodes in the form of rings connected to the same pole.

In these different arrangement modes of FIGS. 3a, 3b, 3c and 3d, the electrodes raised to the same potential can be connected to earth, instead of being connected to the pole of an electric generator.

In the upper part of column 1 is provided an electrocoalescer having three electrodes 13, 15, 17, located between the inlet 3 of the dispersed phase and outlet 5 of the continuous phase. These electrodes are formed by perforated graphite plates, plates 13 and 15 being connected to earth or ground and plate 17 to a voltage supply.

In the embodiment illustrated in FIG. 1, the central part of the column is provided with eight identical stages, in each case formed by a pair of electrodes such as 11–11'. During the operation of the apparatus, it is possible to connect each pair of electrodes to a voltage supply and apply an appropriate potential thereto, so that each stage can be operated as a disperser stage or as a coalescer stage. Thus, as shown hereinbefore, it is possible to obtain two operating ranges, as a function of the voltage value applied to each stage.

For example, when using for the contacting of a dispersed phase constituted by an aqueous acid solution containing tributyl phosphate in solution and a continuous phase constituted by an aromatic hydrocarbon such as a petroleum cut marketed under the trade mark Solvesso 150, a column can be employed whose stages have the following characteristics:
height of the electrodes: L=100 mm,
space between electrodes: D=25.5 mm,
diameter of the conductive part of the electrodes: $d_1=2$ mm,
external diameter of the electrodes: $d_2=6$ mm,
internal diameter of the deflectors: $d_1=6$ mm,
external diameter of the deflectors: $d_2=13$ mm.

The critical value defining these two operating ranges is at 5 kV for a sine-wave voltage frequency of 50 Hz.

Thus, when the voltage applied is below 5 kV, the electric field brings about the coalescence of drops of dispersed phase introduced into the column.

When the voltage applied exceeds 5 kV, the field is large enough to bring about the breaking of the drops, so that there is then a dispersed phase bed in the column having a fixed phase flowrate, the retention coefficient increasing and the drop diameter decreasing as the voltage increases. The transfer unit height (HUT) in the apparatus, defined by the formula $$\frac{H}{\ln(1-E)},$$

in which H represents the total height of the stage and E the Murphree efficiency increases in the coalescence zones and decreases in the dispersion zones to a significant extent compared with operation without a field, under the double effect of decreasing the size of the drops and increasing the overall transfer coefficient by the field.

Thus, it is possible to control in a continuous manner and at all times by means of a simple electrical parameter the potential difference between two electrodes and the transfer flow in the contactor.

Moreover, the insulation of the electrodes makes it possible for the column to operate in a satisfactory manner for all the specific dispersed phase flowrates, i.e. for all retention values. The geometry of the electrodes also makes it possible to retain a limited transfer unit height (HUT) up to high specific dispersed phase flowrates, e.g. of approximately 1.5 l/hcm².

Moreover, by acting on the characteristics of the potential difference at the terminals of each stage (e.g. on the amplitude and frequency in the case of an alternating voltage, or on the duration, the height and the frequency of the pulses in the case of a pulsed voltage), it is possible to vary the corresponding characteristics of the electric field and in this way obtain a particular effect of the two-phase system, e.g. breaking of the drops, coalescence, increasing of the transfer coefficient, etc.

Two operating examples are given hereinafter in order to illustrate the effect of the voltage applied (alternating voltage of 50 Hz) to the electrodes of the apparatus according to the invention.

In the first operating example, all the stages of the apparatus are raised to the same potential and the transfer unit height in the apparatus is determined as a function of the potential applied.

Figure 4:
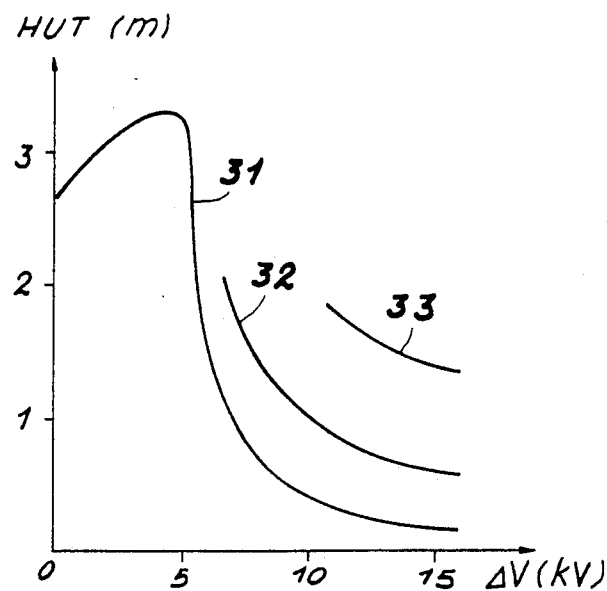
FIG. 4—A graph showing the variations in height of the transfer unit (HUT) in the apparatus, as a function of the potential applied to the electrodes.

The results obtained are given in FIG. 4, which represents the variations of the HUT (in m) as a function of the potential applied (in kV). Curve 31 corresponds to tests carried out with a specific dispersed phase flowrate of 0.5 l/hcm², curve 32 corresponds to a specific aqueous phase flowrate of 1.5 l/hcm² and curve 33 to a specific aqueous phase flowrate of 3 l/hcm².

Curve 31 shows the critical value of 5 kV below which the stages function as coalescers with a transfer unit height increasing with the applied potential. Beyond the critical value of 5 kV, the HUT decreases in significant proportions compared with operation without a field.

In the second operating example of the apparatus according to the invention, the same potential difference is not applied to the terminals of all the stages and the latter either operate as a disperser with a potential difference of 11.25 kV, or as a coalescer with a potential difference of 3.75 kV.

Figure 5:
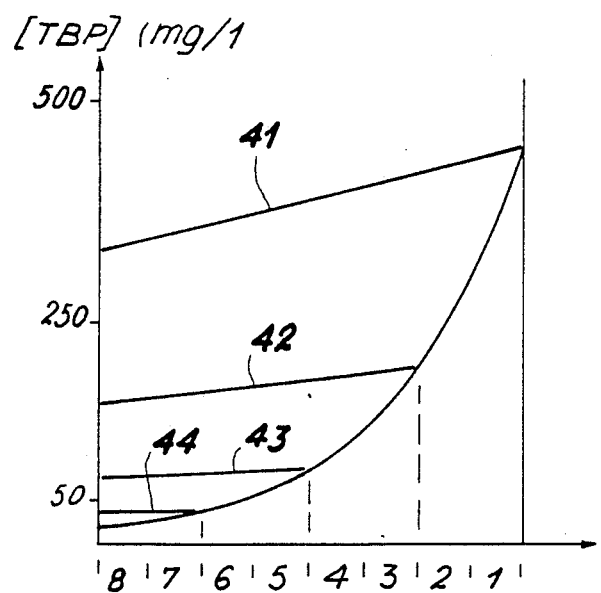
FIG. 5—A graph showing the variations of the solute concentration in the dispersed phase, as a function of height of the column in different operating modes of the apparatus.

FIG. 5 illustrates the concentration variations (in mg/l) of the solute (TBP) in the aqueous phase as a function of the column height in the following cases:
curve 41: the eight stages are coalescers,
curve 42: the two first stages are dispersers and the following stages are coalescers,
curve 43: the first four stages are dispersers and the following four stages are coalescers,
curve 44: the first six stages are dispersers and the two following stages coalescers,
curve 45: the eight stages are dispersers.

On the basis of these curves it can be seen that the concentration decrease in the coalescer stages is slight because the HUT there is great. However, it is high in the disperser stages, where the HUT is low. The outlet concentration is dependent on the distribution of the potential differences along the column.

For comparison purposes, use was made of the same column but without providing deflectors on the electrodes for bringing about a washing of the TBP dissolved in an acid aqueous phase by aromatic hydrocarbon, by applying a potential difference of 11.25 kV to all the stages. Under these conditions, for the lowest specific aqueous flowrate of e.g. 0.5 l/hcm², the transfer unit height (HUT) is approximately twice greater and for the highest specific aqueous phase flowrate of e.g. 1.5 l/hcm², where the trickling phenomenon of the electrodes is more sensitive, the HUT is approximately three times higher.

Thus, the presence of the deflectors makes it possible to significantly improve the operation and performance of the apparatus according to the invention.

What is claimed is:

1. An apparatus for the cocurrent or countercurrent contacting of two immiscible liquids whereof one constitutes a continuous phase and the other constitutes a dispersed phase dispersed in the form of droplets or bubbles in the continuous phase which comprises:

a container having an inlet means for the continuous phase liquid and an inlet means for the dispersed phase liquid and an outlet means for the continuous phase liquid and an outlet means for the dispersed phase liquid;

means for bringing about the mixing and/or separation of the two phases within the container comprising at least two spaced electrodes each having insulant coating comprising at least two layers of different materials, the first layer being an inner layer which is a liquid insulating material in contact with the electrode and the second layer being an outer layer which is a solid insulating material, the area within the container between the electrodes defining an inner electrode space; and means to inhibit the flow of the dispersed phase along the electrodes and to redistribute such flow toward the inner electrode space comprising a deflector mounted on each of said electrodes and being made from a material which resists being wetted by said dispersed phase.

2. An apparatus according to claim 1, wherein the liquid insulating material is chosen from the group consisting of phenylxylylethane, a polychlorobiphenyl compound, benzylneodecanoate and transformer oil.

3. An apparatus according to either of the claims 1 and 2, wherein the solid insulating material is an organic polymer.

4. An apparatus according to claim 3, wherein the organic polymer is chosen from the group consisting of polytetrafluoroethylene, vinylidene polyfluoride, polyethylene and polypropylene.

5. An apparatus according to claim 1, wherein the electrodes are in the form of bars arranged in parallel in flow direction of the liquids.

6. An apparatus according to claim 5, wherein the deflectors are constituted by rings arranged on said bars.

7. An apparatus according to any one of the claims 1 and 5, further comprising a plurality of electrodes arranged in parallel in the liquid flow direction, said electrodes defining in the container a plurality of stages and which can be raised to different potentials, so that the electric field can vary independently in the different stages of the container.

8. An apparatus according to claim 7 for the countercurrent contacting of two immiscible liquids, wherein the inlet means for the continuous phase and outlet means for the dispersed phase are located in a first part of the container and the inlet means for the dispersed phase and the outlet means for the continuous phase are spaced apart and located in a second part of the container, and further comprising an electrocoalescer located in the second part of the container between the second inlet and the second outlet.

9. An apparatus according to claim 8, wherein the electrocoalescer has two electrodes connected to ground surrounding a live electrode.

10. An apparatus according to claim 8, wherein one of the two electrodes is connected to ground and is located in the second part of the container, and the other electrode is live.

11. An apparatus according to claim 1, further comprising a packing.

* * * * *